United States Patent
Podhorsky et al.

[11] Patent Number: 5,282,313
[45] Date of Patent: Feb. 1, 1994

[54] METHOD FOR PRODUCING HEAT EXCHANGE ELEMENTS AND HEAT EXCHANGE ELEMENTS PRODUCED THEREBY

[75] Inventors: Miroslav Podhorsky; Hans-Georg Schrey, both of Ratingen; Jörg Blum, Bochum; Wolfgang Holten, Düsseldorf, all of Fed. Rep. of Germany

[73] Assignee: Balcke-Dürr Aktiengesellschaft, Ratingen, Fed. Rep. of Germany

[21] Appl. No.: 981,177

[22] Filed: Nov. 24, 1992

[30] Foreign Application Priority Data
Dec. 11, 1991 [DE] Fed. Rep. of Germany ....... 4140729

[51] Int. Cl.⁵ .............................................. B23P 15/26
[52] U.S. Cl. ............................. 29/890.046; 29/890.054
[58] Field of Search .................. 29/890.046, 890.054, 29/428, 429, 430–431; 165/153

[56] References Cited

U.S. PATENT DOCUMENTS

| | | | |
|---|---|---|---|
| 3,773,241 | 11/1973 | Norris | 29/890.046 |
| 4,143,710 | 3/1979 | La Porte et al. | 29/890.046 |
| 4,215,454 | 8/1980 | Anthony | 29/890.046 |
| 4,291,450 | 9/1981 | Rhodes | 29/890.046 |
| 4,486,933 | 12/1984 | Iwase et al. | 29/890.046 |

FOREIGN PATENT DOCUMENTS

| | | |
|---|---|---|
| 0490210 | 6/1992 | European Pat. Off. . |
| 1602286 | 4/1970 | Fed. Rep. of Germany . |
| 2105068 | 2/1971 | Fed. Rep. of Germany . |
| 2105070 | 2/1971 | Fed. Rep. of Germany . |
| 2144465 | 9/1971 | Fed. Rep. of Germany . |
| 2700221 | 1/1977 | Fed. Rep. of Germany . |
| 1295142 | 7/1961 | France . |
| 1479551 | 3/1966 | France . |
| 2079269 | 11/1971 | France . |
| 2079271 | 11/1971 | France . |
| 0050120 | 3/1983 | Japan ........................ 29/890.046 |

*Primary Examiner*—Irene Cuda
*Attorney, Agent, or Firm*—Robert W. Becker & Associates

[57] ABSTRACT

A method for producing heat exchange elements having a tubular base body with ribs connected to the outer surface area for increasing the heat exchange surface area are especially suitable for base bodies having a cross-section with a width that is substantially greater than its height. According to the method, the ribs are produced by removing sheet metal strips from a roll and passing them through a corrugating device, positioning the corrugated sheet metal strips on lateral surfaces of the base body and welding the corrugated sheet metal strips to the base body. The application of the corrugated sheet metal strips, their positioning relative to the base body, and the transport of the base body in its longitudinal direction are effected by a special drive unit. For welding the sheet metal strips to the base body, laser heads are preferably used.

4 Claims, 2 Drawing Sheets

METHOD FOR PRODUCING HEAT EXCHANGE ELEMENTS AND HEAT EXCHANGE ELEMENTS PRODUCED THEREBY

BACKGROUND OF THE INVENTION

The present invention relates to a method and a device for producing heat exchange elements with a tubular base body having a cross-section with a width that is substantially greater than its height and provided with ribs at its outer surface for increasing the heat exchange surface area, and also relates to a respective heat exchange element produced by the method and the device.

In order to increase the heat exchange surface area at heat exchange elements with a tubular base body having a cross-section with a width that is substantially greater than its height, it is known from German Offenlegungsschrift 21 44 465 to slide ribbed sheet metal strips, produced by a stamp, onto the base body in its longitudinal direction because for a tubular base body with a cross-section having a width that is much greater than the respective height a spiral winding of a metal band for producing ribs is not possible. With suitable measures a metal band can be wound onto oval tubes with a width-height-ratio of up to 3; however, for a width-height-ratio greater than 3 it is necessary to use ribbed sheet-metal that is slid onto the base body, even though a greater manufacturing expenditure is needed, because the winding of a metal band would require extremely variable angular radii.

From German Offenlegungsschrift 21 05 070 a method is known for producing heat exchange elements with a tubular base body in which the tubular base body is provided with ribs for increasing the heat exchange surface area, wherein on two oppositely arranged sides of the base body one ribbed sheet metal strip each is applied in the longitudinal direction of the base body, whereby the sheet metal is removed from a roll and is folded (corrugated) by a profiling device before being applied to the base body. It is connected to the surface area of the base body at at least some contact points after pressing the sheet metal against the base body. In this known method the transport of the base body is achieved with two drive rollers driven by a motor. The resulting transporting speed of the base body must be adjusted to the feed speed of the two sheet metal strips. For this purpose, the sheet metal strips are not only driven within the profiling device, that comprises gear wheels and is driven by a motor, but also by further motors within the manufacturing device. The known method requires thus a plurality of drive units which must be exactly adjusted relative to one another in order to be able to produce a flawless product. The expenditure for manufacturing and attaching the ribbed sheet metal strips for increasing the heat exchange surface area is thus considerable.

It is therefore an object of the present invention to provide a heat exchange element as well as a method and device for its manufacture wherein the tubular base body, despite its extreme width-height-ratio can be provided with ribs for increasing the heat exchange surface area by a simple and inexpensive continuous method.

BRIEF DESCRIPTION OF THE DRAWINGS

This object, and other objects and advantages of the present invention, will appear more clearly from the following specification in conjunction with the accompanying drawings, in which.

SUMMARY OF THE INVENTION

Figure 1:
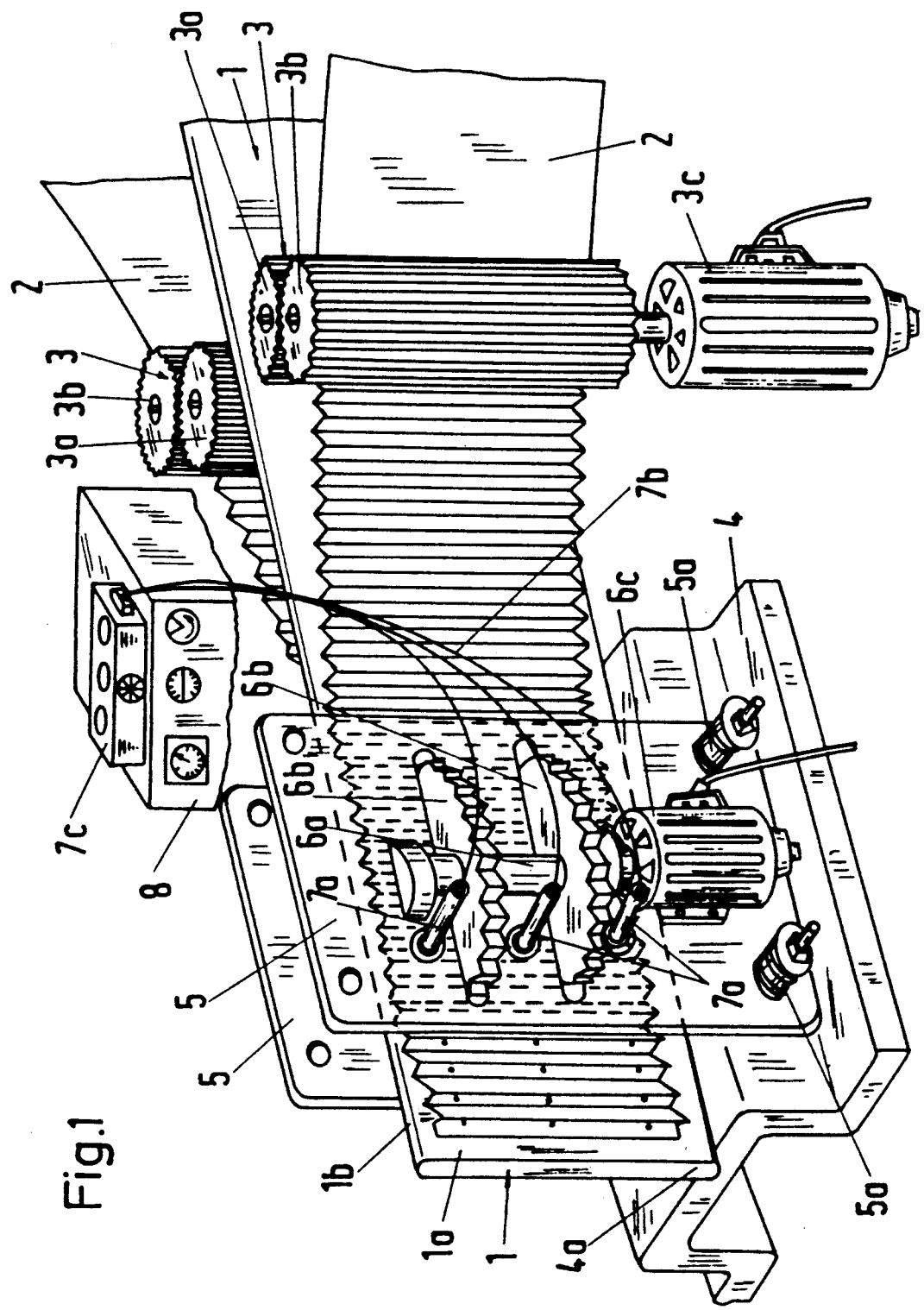
FIG. 1 is a perspective representation of a device according to the present invention and a first embodiment of an inventive heat exchange element.

The method of the present invention for producing heat exchange elements with a tubular base body with ribs attached to the outer surface of the tubular base body for increasing the heat exchange surface area is primarily characterized by the following steps:

Providing the tubular base body with a cross-section having a great width relative to its height so that the hollow base body has two oppositely arranged lateral surfaces of a great surface area for receiving said ribs;

Transporting two sheet metal strips to a corrugating device and corrugating the sheet metal strips to produce corrugated sheet metal strips that form said ribs;

Conveying continuously the tubular base body together with the corrugated sheet metal strips in the longitudinal direction of the tubular base body relative to a welding device by a drive unit that engages the corrugations of the corrugated sheet metal strips and simultaneously positioning the corrugated sheet metal strips relative to the tubular base body; and Pressing each one of the corrugated sheet metal strips to a respective one of the lateral surfaces and attaching the corrugated sheet metal strips at at least some contact points to the lateral surfaces.

The inventive method has the advantage that only one individual drive is required which not only transports the tubular base body in its longitudinal direction, but also applies the previously corrugated sheet metal strips to the tubular base body and positions the sheet metal strips relative to tubular the base body. The sheet metal strips which are removed from a roll and have, for example, a thickness of 0.3 mm, are corrugated or profiled by forming folds and/or wave-shaped profiles before applying the sheet metal strips to the lateral surfaces of the tubular base body and, after being pressed against the surface areas of the oppositely arranged lateral surfaces of the tubular base body, are welded to them at at least some contact points. The distance between welds and the number of the welds depends on the forces to be transmitted by the ribbed sheet metal strips in connection with the tubular base body. With the inventive method heat exchange elements may be provided with respective ribs in a fast and inexpensive manner even for extreme ratios between the width and the height of the cross-section of the tubular base body, whereby materials for the heat exchange elements may be selected from any possible combination of weldable materials.

In a preferred embodiment of the inventive method the drive unit, the welding device, and the corrugating device are controlled by a common control device.

It is expedient that the inventive method comprises the step of stamping depressions into at least a portion of the sheet metal strips before attaching the sheet metal strips to the tubular base body. In an alternative, the method comprises the step of stamping cutouts into at least a portion of the sheet metal strips before attaching the sheet metal strips to the tubular base body. A combination of depressions and cutouts is, of course, also possible. Providing such a structure to the sheet metal strips results in an improvement of the heat exchange between the ribs and the heat exchange medium which passes along the ribs. The size, number, and geometric design of such depressions and/or cutouts depend on the respective requirements and specifications of the heat exchange element.

In a further embodiment of the present invention, the method further comprises the step of providing the cutouts in the form of slots in those areas of the sheet metal strips that come into contact with the tubular base body. When all or a portion of the cutouts are formed as slots within those areas of the sheet metal strips that come into contact with the tubular base body, the deformation of the folded or wave-shaped corrugated sheet metal strips in order to conform to the curved surface of the base body is facilitated so that with the method of the present invention the corrugated or ribbed sheet metal strips may also be applied to tubular base bodies of an essentially elliptical cross-section.

The inventive device for producing heat exchange elements with a tubular base body with ribs attached to the outer surface of the hollow body for increasing the heat exchange surface area, wherein the tubular base body is provided with a cross-section having a great width relative to its height so that the tubular base body has two oppositely arranged lateral surfaces of a great surface area for receiving the ribs, is primarily characterized by:

A corrugating device for corrugating sheet metal strips wherein two sheet metal strips are transported to the corrugating device and corrugated to form corrugated sheet metal strips;

A drive unit for continuously conveying the tubular base body together with the corrugated sheet metal strips in the longitudinal direction of the tubular base body, the drive unit engaging the corrugations of the corrugated sheet metal strips, and simultaneously positioning the corrugated sheet metal strips relative to the tubular base body;

A welding device;

A base plate with at least one lateral guide for guiding the tubular base body, the base plate comprising two pressing plates, the welding device and the drive unit connected to the pressing plates, wherein the pressing plates press the corrugated sheet metal strips onto a respective one of the lateral surfaces, thereby providing contact points between the corrugated sheet metal strips and the tubular base body, and wherein the welding device welds the sheet metal strips at at least some contact points to the lateral surfaces of the tubular base body; and A control device operatively connected to the corrugating device, the drive unit, and the welding device.

With this inventive embodiment a constructively simple device results which may be further improved by comprising means for elastically forcing the pressing plates toward the tubular base body. The elastic or spring forces may be provided by springs in the form of mechanical springs or pressure medium cylinders whereby it is advantageous to be able to adjust the respective elastic or spring force depending on the material and the embodiment of the corrugated sheet metal strips.

According to an advantageous embodiment of the inventive device, the drive unit comprises at least one pair of drive rollers, the drive rollers having a circumferential profiling corresponding to the corrugations of the corrugated sheet metal strips, and further comprises a drive motor drivingly connected to at least one drive roller. For an unfavorable geometry of the corrugations of the corrugated sheet metal strips the drive rollers may be replaced by racks. Accordingly, the drive unit comprises a means for driving the racks that is drivingly connected to the racks. The racks have a profiling corresponding to the corrugations of the corrugated sheet metal strips. With this inventive embodiment a constructively simple and reliable drive for transporting the base body as well as the corrugated sheet metal strips relative to the welding device is provided, and, simultaneously, an exact positioning of the corrugated sheet metal strips on the base body is ensured so that a simple control of the welding device is possible.

The welding device comprises a plurality of laser heads controlled by the control device, whereby the laser head produce spot welds and/or linear welds. Preferably, the laser heads are YAG (Yttrium-aluminum-garnet) lasers which are connected to the base unit via fiberglass cable.

In a preferred embodiment of t he present invention, the drive unit comprises a first and a second shaft, with a plurality of drive rollers connected to each shaft so as to be spaced at a distance from one another. Each shaft is coordinated with one of the pressing plates. The laser heads in this embodiment are positioned between or adjacent to the drive rollers.

The inventive heat exchange element comprises a tubular base body with a cross-section having a great width relative to its height so that the tubular base body has two oppositely arranged lateral surfaces of a great surface area, and ribs, formed of corrugated sheet metal strips, for increasing the heat exchange surface area, the ribs attached by welding to the lateral surfaces of a great surface area in a longitudinal direction of the tubular base body at at least some of the contact points between the corrugated sheet metal strips and the tubular base body, with a width of the ribs being smaller than the width of the tubular base body so that the area adjacent to the longitudinal edges of the tubular base body are free of ribs. The area adjacent to the longitudinal edges of the tubular base body free of ribs are designed to serve as guides in the longitudinal direction of the base body and rest at the base plate of the inventive device. With this inventive embodiment of the heat exchange elements the longitudinal guiding means of the corresponding manufacturing device can be provided in a simple manner with a great guiding surface area.

The corrugated sheet metal strips have depressions and/or cutouts stamped into at least a portion of the corrugated sheet metal strips. These depressions and/or cutouts serve to improve the heat exchange and the adaptation of the corrugated sheet metal strips to the curve surface of the hollow base body.

DESCRIPTION OF PREFERRED EMBODIMENTS

The present invention will now be described in detail with the aid of several specific embodiments utilizing FIGS. 1 through 4.

As can be seen in FIG. 1, the heat exchange element is comprised of a tubular base body 1 the cross-section of which can be seen in the left portion of the drawing. This cross-section has a width that is substantially greater than its height. In practice, the height is approximately 20 mm, the width is between 100 and 250 mm so that a width-height-ratio of 5 to 12.5 results. The hollow base body 1 which is preferably comprised of steel has flat lateral surfaces 1a of a great surface area for accommodating the ribs and in the shown embodiment is provided with rounded longitudinal edges 1b.

A ribbed or corrugated sheet metal strip 2 is applied to each one of the oppositely arranged lateral surfaces 1a of the tubular base body 1. A flat sheet metal strip 2 is removed from a roll which is not represented in the drawing and is corrugated, i.e., folded or provided with a wave-shaped profile, in a corrugating device 3. In a preferred embodiment the sheet metal strips 2 have a thickness of 0.3 mm. They are corrugated in the corrugating device 3 such that folds of a height of 14 mm spaced at a distance of 6 mm are produced. In this profiled or corrugated state the sheet metal strips 2 are applied to the lateral surfaces 1a of the base body 1 and are welded to the base body. The ribbed or corrugated sheet metal strips 2 are preferably also comprised of sheet steel, but may also be produced from aluminum. In general any suitable material combination is possible as long as the selected materials are weldable.

In the embodiment represented in FIG. 1, the corrugating device 3 is comprised of two corrugating rollers 3a, 3b which mesh with one another such that the sheet metal strips 2 passing through them are provided with corrugations corresponding to the profilings of the corrugating rollers 3a, 3b while being simultaneously and continuously removed from the non-represented roll. For this purpose, at least one of the roller pairs 3a, 3b is driven by a motor 3c which is controllable for adjusting the desired feed speed of the base body 1.

The tubular base body 1, in the shown embodiment, is guided on edge in a longitudinal guide 4a of the base plate 4. At the base plate 4 two pressing plates 5 are arranged which serve to press the corrugated sheet metal strips 2 against the surface area of the lateral surfaces 1a of the base body 1. For this purpose, the pressing plates 5 are loaded by elastic or spring forces in the direction toward the base body 1. In the shown embodiment, two coil springs 5a acting on the outer side of the pressing plate 5 are illustrated which have an adjustable spring force. The pressing of the corrugated sheet metal strips 2 onto the base body 1 can be achieved directly via the pressing plates 5 or indirectly via the drive rollers 6b.

Coordinated with each of the pressing plates 5 is a drive unit which, in the shown embodiment, is comprised of two drive rollers 6b connected to a common shaft 6a. These drive rollers 6b are provided with a circumferential toothed profile corresponding to the corrugations of the corrugated sheet metal strips 2 so that the drive rollers 6b engage in the manner of gear wheels the rack-like corrugations of the corrugated sheet metal strips 2 when the shaft 6a is driven by the drive motor 6c. The drive unit comprised of the shaft 6a, the drive rollers 6b, and the drive motor 6c, thus not only effects a longitudinal movement of the base body 1 to which the corrugated sheet metal strips 2 are welded, but simultaneously an exact positioning of the corrugated sheet metal strips 2 on the lateral surfaces 1a of the tubular base body 1.

With this exact positioning of the corrugated sheet metal strips 2 their welding to the lateral surfaces 1a of the base body 1 is simplified. The welding is performed in the shown embodiment with the welding device that comprises six laser heads 7a three of which are coordinated with one pressing plate 5 and positioned between, or adjacent to, the drive rollers 6b. The laser heads 7a are connected via a fiberglass cable 7b to a YAG laser 7c. The laser heads 7a can be designed to generate spot welds or linear welds. They are controlled such that they weld the corrugated sheet metal strips 2 at some of the contact points to the lateral surfaces 1a of the tubular base body 1 whereby it is required to control the welding process as a function of the transporting speed and the arrangement or position of the corrugations of the sheet metal strips 2 on the base body 1.

In order to synchronize not only the motors 3c of the corrugating device 3 and the drive motor 6c of the drive unit, but also the YAG laser 7c depending on the longitudinal speed of the generated heat exchange elements, a common control device 8 is provided. The connection of the corrugated sheet metal strip 2 with the base body 1 with the aid of the laser heads 7a can be achieved with spot welds or linear welds. The number of connecting or welding locations is selected depending on the respective requirements and specification of the heat exchange element, preferably depending on the inner pressure within the interior of the base body 1 of the heat exchange elements relative to the outer pressure. The corrugated sheet metal strips 2 connected to the lateral surfaces 1a of the tubular base body 1 have not only the task to increase the heat exchange surface area, but also serve to reinforce the base body 1 which in many cases is not stable or self-supporting by itself. The finished heat exchange element, if desired, may be galvanized in a dipping process.

Figure 2:
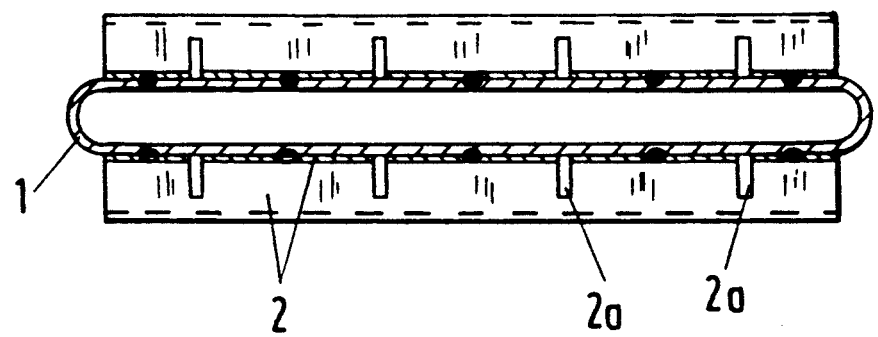
FIG. 2 is a cross-section of a second embodiment of an inventive heat exchange element.
Figure 3:
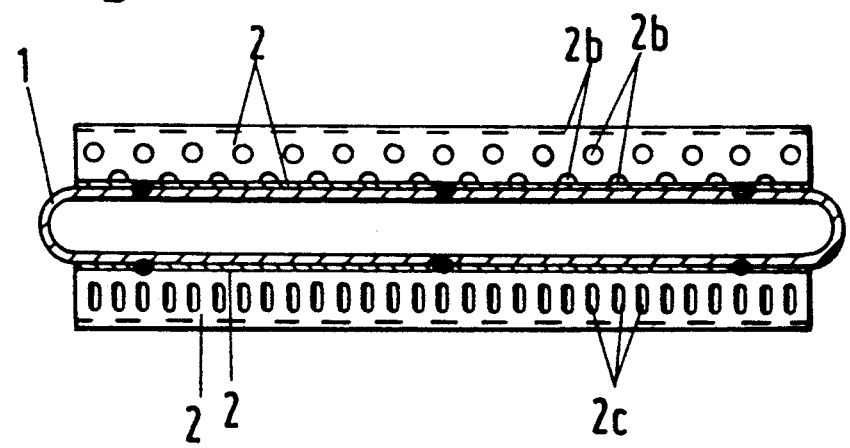
FIG. 3 is a cross-section corresponding to the representation of FIG. 2 of a third inventive embodiment.
Figure 4:
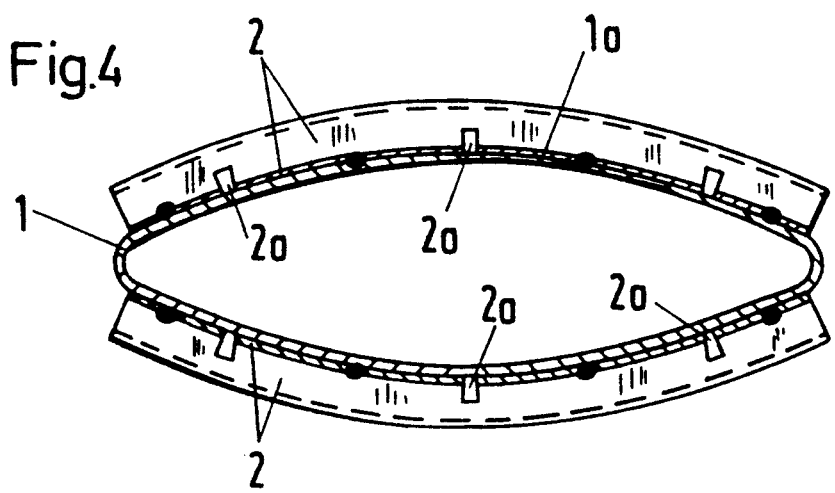
FIG. 4 is a cross-section of another embodiment of the inventive heat exchange element.

FIGS. 2, 3, and 4 show further embodiments of the heat exchange elements of the present invention. In FIG. 2 it is shown that the corrugated sheet metal strips 2 are provided with stamped-out slots 2a. These slots 2a are produced in the sheet metal strips 2 before they are corrugated and are located on the side of the sheet metal strips that is facing the base body 1 and extend over $\frac{1}{3}$ to $\frac{1}{2}$ of the height of the ribs. The medium which passes the ribs has thus the possibility to exit from one of the ribbed channels and to mix with the medium in a neighboring channel in order to thereby compensate temperature differences and improve the heat exchange.

In the embodiment according to FIG. 3, the corrugated sheet metal strips are provided with a uniform surface structure comprised of depressions 2b and 2c. The geometric shape of these depressions 2b, according to the upper representation in FIG. 3, may be circular or, according to the bottom representations of FIG. 3, elliptical, or may have any other desired shape. It is also possible to provide a combination of slots 2a with the aforementioned depressions in order to improve the heat exchange properties.

The fourth embodiment in FIG. 4 shows the use of a base body 1 which has an elliptical cross-section. In this case, the slots 2a, provided within the area of the sheet metal strip 2 that are contacting the base body 1, facilitate the adaptation of the wave-shaped or folded sheet metal strips 2 to the curved lateral surfaces 1a of the tubular base body 1 so that not only base bodies with flat lateral surfaces 1a but also curved base bodies 1 can be provided with ribbed or corrugated sheet metal strips 2 in the aforedescribed manner.

The present invention is, of course, in no way restricted to the specific disclosure of the specification and drawings, but also encompasses any modifications within the scope of the appended claims.

What we claim is:

1. A method for producing heat exchange elements with a tubular base body with ribs attached to the outer surface of said tubular base body for increasing the heat exchange surface area, said method comprising the steps of:

providing said tubular base body with a cross-section having a width to height ratio of 1 to 5-12.5 so that said tubular base body has two oppositely arranged lateral surfaces corresponding to said height for receiving said ribs, said lateral surfaces substantially greater than surfaces corresponding to said width;

transporting two sheet metal strips to a corrugating device and corrugating said sheet metal strips to produce corrugated sheet metal strips that form said ribs;

conveying continuously said tubular base body together with said corrugated sheet metal strips in the longitudinal direction of said tubular base body relative to a welding device and simultaneously positioning said corrugated sheet metal strips relative to said tubular base body with a drive unit that engages the corrugations of said corrugated sheet metal strips; and pressing each one of said corrugated sheet metal strips to a respective one of said lateral surfaces and welding said corrugated sheet metal strips with at least some contact points between said lateral surfaces and said corrugated sheet metal strip to said lateral surfaces.

2. A method according to claim 1, further comprising the step of controlling with a common control device the drive unit, the welding device, and the corrugating device.

3. A method according to claim 1, further comprising the step of stamping depressions into at least a portion of said sheet metal strips before attaching said sheet metal strips to said tubular base body.

4. A method according to claim 1, further comprising the step of stamping cutouts in the form of slots into a portion of said sheet metal strips that comes into contact with said tubular base body.

* * * * *